UNITED STATES PATENT OFFICE.

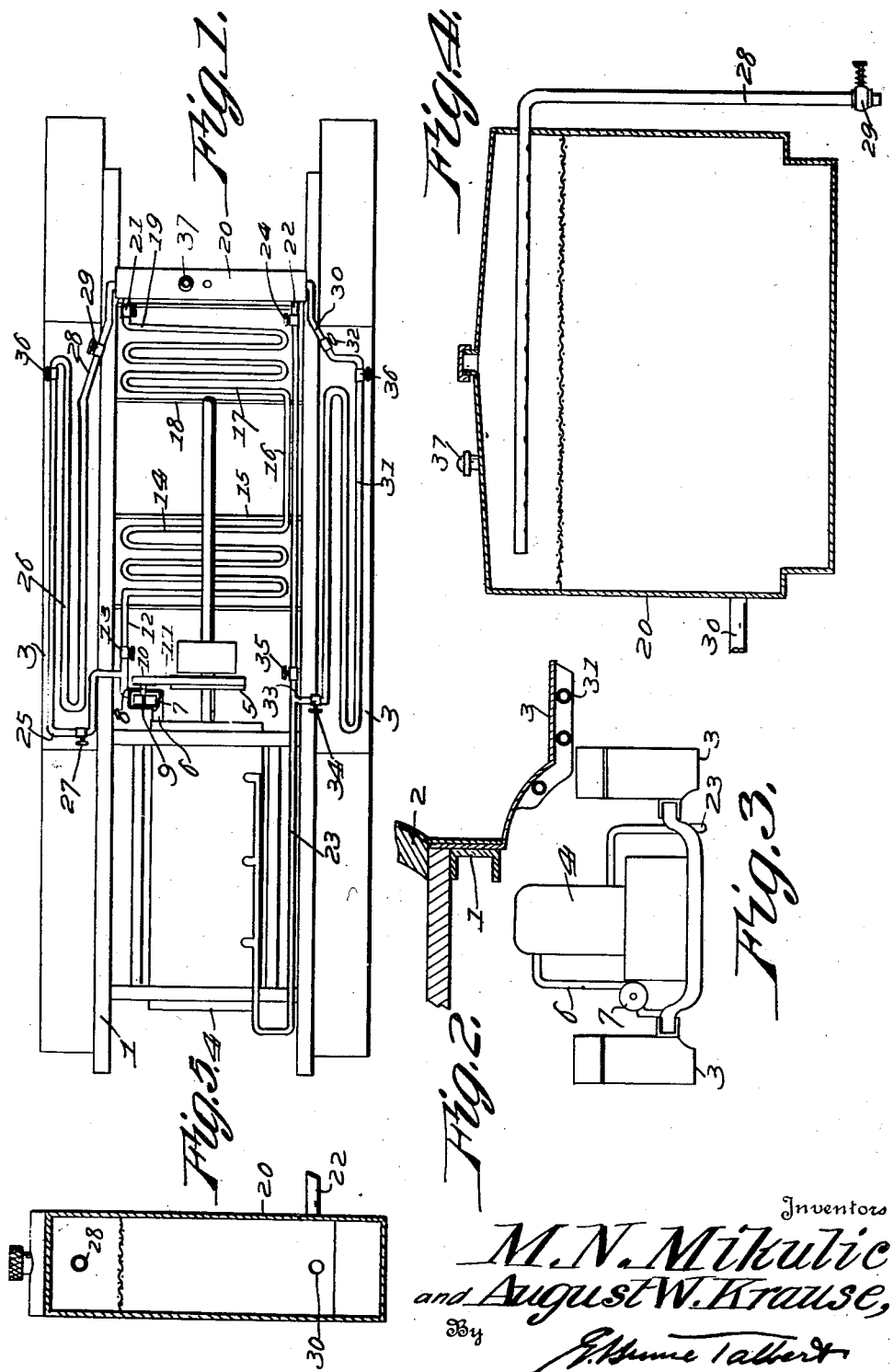

MILOS NIKOLA MIKULIC AND AUGUST WILLIAM KRAUSE, OF KANSAS CITY, MISSOURI.

COMBINED ENGINE-COOLER AND VEHICLE-HEATER.

1,316,495.           Specification of Letters Patent.     Patented Sept. 16, 1919.

Application filed September 7, 1917. Serial No. 190,225.

*To all whom it may concern:*

Be it known that we, MILOS NIKOLA MIKULIC and AUGUST WILLIAM KRAUSE, citizens of the United States, residing at Kansas City, in the county of Jackson and State of Missouri, have invented new and useful Improvements in Combined Engine - Coolers and Vehicle-Heaters, of which the following is a specification.

The principal aim and object of this invention is the provision of a system of the character mentioned wherein the engine of a motor vehicle may be at all times kept cool so as to insure of the efficient operation thereof and at the same time provide for the heated water taken from the jackets of the cylinders being utilized to heat the body of the vehicle.

It is an additional and equally important object of this invention to provide a system wherein the hot water which is pumped from the engine cylinders may be either circulated for the heating of the body of the vehicle or directed exteriorly of the body of the car and led to a cooling tank preparatory to being returned to the engine cylinders in a cooled condition for producing a cooling effect on the engine cylinders.

More particularly the present invention includes the provision of a cooling and heating system for use on a motor vehicle, the flow of water through which is capable of being controlled to vary the temperature within the body of the car or if desired prevented from heating the car so that under the latter condition the water in the system will act only as a cooling means.

Among the other aims and objects of this invention may be recited the provision of a device of the character described which is compact, and in which the parts are few, the construction simple, the cost of production low, and the efficiency high.

Other improvements and novel details in the construction and arrangement of the various parts of the apparatus are brought out more in detail in the description following, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which;

Figure 1 is a bottom plan view of the invention in position;

Fig. 2 is a fragmentary transverse sectional view taken through one of the side foot boards;

Fig. 3 is a fragmentary front elevation of the invention.

Fig. 4 is a longitudinal vertical section through the cooling tank.

Fig. 5 is a transverse section through Fig. 4.

Similar characters of reference are employed in all the above described views, to indicate corresponding parts.

Referring now, more particularly, to the accompanying drawings, there is provided a vehicle embodying a chassis 1 on which is supported a body 2 and provided on opposite sides with foot boards 3. An engine 4 of any conventional construction is mounted on the front end of the chassis being provided with a fly wheel 5.

With a view toward providing improved means for heating the body of the vehicle, a pipe 6 is led from the top of one of the jacketed cylinders of the engine and is arranged in communication with a pump casing 7. A shaft 8 is journaled in the pump casing while a pump 9 is mounted on the inner end of the shaft and rotates within the casing so as to draw hot water from the jackets of the cylinders. The preferred means for rotating the pump consists of a pulley wheel 10 carried by the outer end of the shaft 8 and over which is trained a belt 11, the belt in turn being trained about the fly wheel 5 so as to transmit rotary motion from the engine to the shaft 8. Another pipe 12 leads from the pump casing while a control valve 13 is mounted therein to control the passage of heated water therethrough. A pipe coil 14 communicates with the outer end of the pipe 12 and is preferably positioned in a casing 15 mounted beneath the front seat in the vehicle body while leading from the pipe coil 14 is a connecting pipe 16 which conducts water from the coil 14 to another coil 17 positioned in a casing 18 mounted beneath the rear seat in the body of the vehicle. An inlet pipe 19 extends from the outer end of the coil 17 and extends into a cooling tank 20 mounted in the rear end of the chassis while a manually operable valve 21 controls the passage of water into the cooling tank. A strainer is positioned transversely in the tank 20 beneath the inlet pipe 19 and serves as a means for preventing foreign matter passing through the tank. A return pipe 22 is led from the tank and terminates at its outer end in branches 23 which lead to the engine cylinders. A manually operable valve 24 mounted in the pipe 22 adjacent the tank 20 controls the return of cooled water into the cylinders of the engine 4. It is to be appreciated by this arrangement that when the valves 13, 21 and 24 are open and the engine is in operation, hot water is drawn from the engine by the pump 9 and forced through the pipe 12 into the coil 14 and thence into the coil 17. The heat which radiates from these coils serves to heat the vehicle. The hot water is now conducted to the cooling tank and subsequently returned to the engine cylinders in a cooled condition through the medium of the return pipe 22.

As intimated, improved means have also been provided for assuring of an effective cooling of the water. In reducing this feature of the invention to practice a conducting pipe 25 is led from the pipe 12 at a point between the pump casing and the valve 13 and communicates with a pipe coil 26 supported on the under surface of one of the side foot boards supported on the body. The passage of water which is forced through the pipe 5 by the pump 9 is controlled by a manually operable valve 27 mounted in the pipe 25. Another pipe 28 is led from the opposite end of the pipe coil 26 and communicates with the cooling tank 20, the passage of water therethrough being controlled by a manually operable valve 29. A short return pipe 30 projects from the opposite end of the tank 20 and communicates with another pipe coil 31 mounted on the under surface of the opposite foot board 3 and the passage of water thereinto is controlled by a manually operable valve 32 in the pipe 30. Still another pipe 33 continues from the coil 31 and communicates with the return pipe 22. A manually operable valve 34 controls the flow of water into the return pipe 22 while still another manually operable valve 35 is mounted in the return pipe and prevents back flow to the cooling tank so that the water which is forced through the coil 31 is forced toward the outer end of the pipe 22 and thence through the branches 23 thereof into the engine cylinders. By this arrangement of the coils 26 and 31 which communicate with the tank 20, and by reason of the fact that the coils are positioned exteriorly of the body of the vehicle and are subjected to the action of the outside air as the vehicle is in motion, the water passing therethrough will be cooled so as to assure of an effective cooling of the water preparatory to the return to the cylinders of the water to the engine. Of course this system is used in this manner in very hot weather and it will also be understood that when it is used, the valves 13, 21, 24 and 35 are closed so as to prevent the water from being forced through the heating coils 14 and 16 for the body of the vehicle.

To permit the draining of the water from the system, drain plugs 36 are mounted in the coils 26 and 31 and of course when open permit the water to pass from the coils. Should it be desired to make repairs to the coils 26 and 31, the valves 27, 29, 32, 34 may be closed to prevent passage of water from the pipes. A safety valve 37 is also mounted on the tank.

The mode of operation of the present invention may be reviewed as follows:

Assuming that the parts have been assembled in the manner described and illustrated in the drawings, to employ the system so as to heat the body of the vehicle and cool the engine the valves 27, 29, 32 and 34 are closed and during the operation of the engine 4 owing to the operable connection between the pump shaft 8 and the fly wheel 5 the pump 9 will be rotated to draw hot water from the top of the engine and force it through the pipe 12 into the coil 14 and then into the coil 17 through the medium of the pipe 16, and thence into the cooling tank 20. The heat radiating from the hot water in the coils 14 and 17 is transmitted to the body of the vehicle whereupon the water passes through the cooling tank and returns to the engine cylinders by way of the return pipe 22. In extremely hot weather when it is desired to effectively cool the hot water the valves 13, 21, 24 and 35 are closed and the valves 27, 29, 32 and 34 are opened so that the water will be forced into the pipe 25, into the pipe coil 26 and thence through the pipe 28 into the cooling tank 20. From the tank it is forced through the pipe 30 into the pipe coil 31 and thence through the pipe 33 into the return pipe 22 and finally into the engine so as to effectively cool the cylinders thereof. Of course this circulation of water continues. It is to be appreciated that by closing the valves 27, 29, 24 and 35 the water will be forced through the coils 14 and 17 into the tank 20 and thence through the coil 31. By this arrangement besides heating the body of the car, the water may be cooled more effectively. It is also to be appreciated that if desired all of the valves may be partly opened so that some of the water will be pumped through both the heating coils 14 and 17 and the cooling coils 26 and 31 as well as the cooling tank. Either of these arrangements may be employed to suit the conditions of the weather.

As many changes could be made in the above construction and many apparently widely different embodiments of this invention could be made without departing from the scope thereof, it is intended that all matter contained in the above description or shown in the accompanying drawings shall be interpreted as illustrative and not in a limited sense. It is also to be understood that the language used in the following claim is intended to cover all the generic and specific features of the invention herein described and all statements of the scope of the invention which, as a matter of language might be said to fall therebetween.

Having thus fully described this invention what is claimed as new and desired to be secured by Letters-Patent, is:—

In an apparatus of the kind described, the combination with an auto vehicle and driving motor therefor, of a pair of coils carried in the body below the seats thereof, a tank carried at the rear of the body, the two said coils being serially connected with one connecting with the said tank, a pump with which the remaining end of the other connections, a pipe connection between the pump and the water jacket of the driving motor, a pipe connection between the said water jacket and the said tank, pipe coils carried by the vehicle below the running boards thereof, one end of one of these coils connecting with the tank adjacent the bottom, one end of the other of the last said coils connecting with the pipe connection between the water jacket and the tank and the remaining end of this coil connecting with the tank adjacent the upper end thereof, valves carried by the serially connected coils adjacent the pump and adjacent the tank respectively, valves carried in said tubular connection adjacent the tank and adjacent the point of connection of one of the second said set of coils with said pipe, and valves carried by each of the second said pipe coils adjacent the terminals of the latter, whereby the cooling medium for the driving motor may be circulated through the water jacket, the serially connected coils and the tank, or through the water jacket, the coils carried beneath the running boards and the tank, or through the water jacket, both sets of coils and the tank.

In testimony whereof we affix our signatures.

MILOS NIKOLA MIKULIC.
AUGUST WILLIAM KRAUSE.